Oct. 26, 1954     E. B. HATHAWAY     2,692,963
ELECTRIC SWITCHING APPARATUS
Filed April 27, 1951
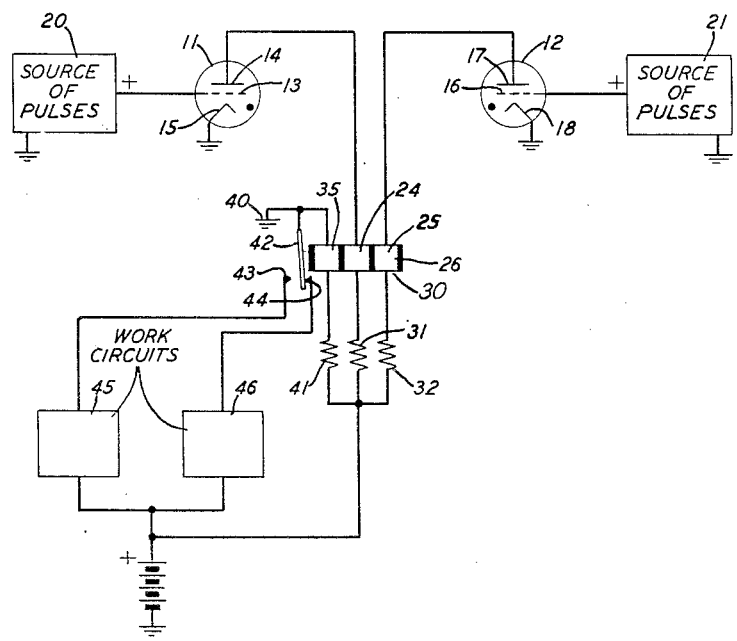
INVENTOR
E. B. HATHAWAY
BY
ATTORNEY Patented Oct. 26, 1954

2,692,963

UNITED STATES PATENT OFFICE 2,692,963

ELECTRIC SWITCHING APPARATUS

Earl B. Hathaway, East Levittown, N. Y., assignor to Western Electric Company, Incorporated, New York, N. Y., a corporation of New York Application April 27, 1951, Serial No. 223,308

3 Claims. (Cl. 317—149)

This invention relates to switching apparatus and more particularly to a device for switching electronic tubes in unison.

In working with electrical equipment, it is often desirable to make certain apparatus responsive to impulses received from an element being tested or from other sources so that the apparatus may act as an indicator or may carry out needed operations. Since these impulses are often small in magnitude and short in deviation, gas filled electronic tubes are frequently used to provide the sensitivity necessary for this response.

Where two gas filled tubes are used together to provide a switching type of action, it is necessary to reset one of the tubes after the other tube has been driven to conduction in order to place it in condition to receive the next incoming pulse. In the past, it has been customary to use relays for this purpose, with a relay located in each plate circuit serving to reset the other tube when the relay is energized. This relay system is satisfactory for many applications; however, in cases where the actuating pulses have a short time spacing, the relative slowness of operation of the relays makes this method unsuitable as the resetting of a particular tube does not occur quickly enough to condition the tube to respond to the next pulse.

It is therefore an object of this invention to provide means for switching off one of a pair of gas tubes substantially simultaneously with the switching on of the other.

Applicant accomplishes this object by placing one of a pair of windings in the plate circuit of each of a pair of gas filled tubes, with the two windings being closely spaced to insure inductive coupling therebetween. The firing of one tube thus creates an induced voltage in the plate circuit of the other tube which reduces the effective plate voltage of the other tube and thereby resets it. Means which are responsive to the conductive condition of the tubes may be provided for controlling the external circuits.

Other objects and advantages will be apparent from the following detailed description taken in conjunction with the attached drawing in which the single figure is a schematic wiring diagram of the invention.

With reference to the drawing, the two control tubes are designated as 11 and 12, these tubes being of the gas filled trigger type. Tube 11 has a conventional grid 13, plate 14, and cathode 15, while tube 12 has a corresponding grid 16, plate 17, and cathode 18. The two cathodes are grounded as shown. The positive pulses for firing the tubes 11 and 12 are placed on the grids thereof from signal sources 20 and 21 respectively. The exact manner in which these pulses are derived and timed is not a part of the invention and will, of course, vary with the particular application in which the invention is used.

The plate circuit of tube 11 includes a coil 24 and the plate circuit of tube 12, a corresponding coil 25. These coils are both wound about a core 26 of soft iron or similar material and are positioned in close physical proximity to each other. These coils may either be separate or may be the two halves of a tapped winding. The core 26 forms a part of a relay generally designated as 30. The two windings 24 and 25 are connected through current limiting resistors 31 and 32 to the positive side of a source of D. C. plate potential for the two tubes.

The relay 30 is biased in a given direction by means of a winding 35 which is wound on the same core 26 as the windings 24 and 25. D. C. potential is applied continuously to this winding since one end of the winding is connected to ground at 40, while the other end is connected to the positive side of the D. C. supply through resistor 41.

The relay 30 includes a swinging contact 42, also grounded at 40, and contacts 43 and 44. An auxiliary relay 45 is connected between contact 43 and the positive side of the D. C. voltage supply while an auxiliary relay 46 is similarly connected between contact 44 and the voltage source. It will be obvious from the diagram of Fig. 1 that when the relay 30 is operated, the swinging contact 42 will close against contact 44 and close an energizing circuit for auxiliary relay 46, causing it to operate. The release of relay 30 will correspondingly energize and operate the auxiliary relay 45. The relays 45 and 46 are symbolic of the work circuits to be selectively controlled by impulses from signal sources 20 and 21.

With reference to the operation of the invention, assume that tube 11 is in a conducting, while tube 12 is in a nonconducting state. If a firing pulse from signal source 21 is fed at this time onto the grid 16 of tube 12, it will trigger the tube and drive it to conduction. When this happens, the surge of current through the coil 25 in the plate circuit of the tube, will, through the mutual inductance between the coils 25 and 24, cause a large counter e. m. f. to appear in the coil 24, which is in the plate circuit of the tube 11. This induced voltage is in a direction which opposes the normal plate voltage of the tube, and reduces the effective voltage upon the plate to a point below its cut off value. This will cause tube 11 to stop conducting, and the tube will remain in a non-conducting state until it again receives a positive pulse from its signal source 20. It will thus be seen that each time one of the tubes is triggered, it will simultaneously, through the mutual inductance of the plate coils 24 and 25, cause the other tube to stop conducting, thus placing it in readiness to receive the next actuating pulse.

Inasmuch as the surge of current through one plate circuit caused by its triggering and the driving of the other tube to non-conduction takes place practically instantaneously, the magnetic fields determining the operation or non-operation of the relay 30 are essentially those produced by the steady state plate currents of the two tubes. The two coils are oppositely wound, with the magnetic field set up in coil 24 when tube 11 is conducting, adding to the permanent field of coil 35 to cause the relay 30 to operate and energize work circuit 46, while the field set up in coil 25 when tube 12 is conducting neutralizes the permanent field and causes the relay to release and thereby energize work circuit 45.

In addition to the above method, it is possible to bias the relay in other ways. One way would be to use the swinger contact 42 as a movable core which is magnetized alternately in opposite directions by windings 24 and 25 and which reacts with a permanent magnet to alternately make contact at 43 and 44. The essential requirement is that the external work circuits 45 and 46 be controlled by means which are responsive to the conductive condition of the tube.

In this relay construction the biased winding 35 would be used primarily to move the relay contact 42 to a desired position in case neither both tubes are in a non-conducting state.

Since one relay only is used to cut off the tube not receiving the desired impulse, in order to place the tube in a non-conducting condition prior to its receiving its intended pulse, and since the same relay is used to control the on-off operation of the two work circuits, applicant's apparatus proves both simple and economical. The auxiliary relays shown may be used in turn to control other apparatus as desired; however, such ultimate function is not a part of the invention claimed.

Although the use of a relay affords a simple and convenient way of carrying out the invention, it may be carried out in other ways. For example, in place of a relay, it is possible to employ coils 24 and 25 which are not part of a relay, and to use the voltage drop across the current limiting resistors 31 and 32 to control suitable electronic tubes and thereby the work circuits.

It is to be understood that the above described arrangements are simply illustrative of the application of the principles of the invention. Numerous other arrangements may be readily devised by those skilled in the art which will embody the principles of the invention and fall within the skilled in the art which will embody the principles of the invention and fall within the spirit and scope thereof.

What is claimed is:

1. In a switching device, two gaseous discharge tubes, each having a plate, a cathode and a control electrode, means for applying firing potentials to the control electrodes, plate-cathode circuits for the tubes including a source of D. C. potential, and a coil located in the plate-cathode circuit of each tube, the two coils being in close proximity to provide inductive coupling therebetween and cause the firing of one tube to cut off the other tube.

2. A control circuit for switching off an energized circuit when another circuit is energized comprising two gaseous discharge tubes each having a plate, a cathode and a control electrode, means for selectively applying firing potentials to the control electrodes, plate-cathode circuits including a source of D. C. voltage for the tubes, for biasing each plate at a value higher than that required for sustaining conduction through the tube but lower than that required for firing the tube, external circuits to be controlled, a double winding relay having contacts for controlling the circuits, one winding being serially connected in each plate-cathode circuit, the windings being inductively related such that the voltage induced in the winding of one tube circuit when the other tube is fired is sufficient to lower the plate potential of said one tube to a value below that required for sustaining conduction through the tube.

3. In a switching device, two gaseous discharge tubes, each having a plate, a cathode and a control electrode, means for applying firing potentials to the control electrodes, a plate-cathode circuit for each tube including a source of D. C. potential, said D. C. potential biasing the plate at a value higher than that required for sustaining conduction through the tube but lower than that required for firing the tube and a coil located in the plate-cathode circuit of each tube, the two coils being in close proximity to provide inductive coupling therebetween such that the voltage induced in the coil of one tube when the other tube is fired is sufficient to lower the plate potential of said one tube to a value below that required for sustaining conduction through the tube.

References Cited in the file of this patent

UNITED STATES PATENTS

| Number | Name | Date |
|---|---|---|
| 2,045,402 | Myers | June 23, 1936 |
| 2,170,203 | Latimer | Aug. 22, 1939 |
| 2,410,524 | Richardson | Nov. 2, 1946 |
| 2,476,963 | Dunn | July 26, 1949 |
| 2,493,575 | Edwards | Jan. 3, 1950 |
| 2,505,511 | Vogel | Apr. 25, 1950 |
| 2,519,247 | Holden | Aug. 15, 1950 |

FOREIGN PATENTS

| Number | Country | Date |
|---|---|---|
| 505,500 | Great Britain | May 11, 1939 |